United States Patent [19]

Yamamori et al.

[11] Patent Number: 4,480,500
[45] Date of Patent: Nov. 6, 1984

[54] GEAR NOISE SUPPRESSING TYPE FINAL GEAR TRAIN OF TRANSAXLE

[75] Inventors: Takahiro Yamamori; Kazuyoshi Iwanaga, both of Yokohama, Japan

[73] Assignee: Nissan Motor Company, Limited, Yokohama, Japan

[21] Appl. No.: 342,248

[22] Filed: Jan. 25, 1982

[30] Foreign Application Priority Data

Feb. 9, 1981 [JP] Japan .................... 56-16955

[51] Int. Cl.³ .................... F16H 1/40; F16H 57/02
[52] U.S. Cl. .................... 74/713; 74/607
[58] Field of Search .................... 74/713, 710.5, 710, 74/701, 607

[56] References Cited

U.S. PATENT DOCUMENTS

| | | | |
|---|---|---|---|
| 2,142,575 | 1/1939 | Spicacci | 74/710 |
| 3,323,844 | 6/1967 | Hedstrom | 74/713 |
| 3,548,683 | 11/1968 | Fisher | 74/713 |
| 3,848,482 | 11/1974 | Shank | 74/710 |
| 3,872,741 | 3/1975 | Berchtold et al. | 74/713 |
| 4,077,279 | 3/1978 | Goscenski, Jr. | 74/713 |
| 4,244,241 | 1/1981 | Treadwell | 74/710 |
| 4,244,242 | 1/1981 | Uno et al. | 74/710 |
| 4,283,963 | 8/1981 | Hickey et al. | 74/713 |
| 4,294,218 | 10/1981 | King et al. | 74/713 |

FOREIGN PATENT DOCUMENTS

| | | |
|---|---|---|
| 3015000 | 11/1980 | Fed. Rep. of Germany . |
| 1153720 | 9/1966 | United Kingdom . |
| 1494110 | 10/1975 | United Kingdom . |
| 1539941 | 5/1976 | United Kingdom . |
| 1537585 | 6/1976 | United Kingdom . |

Primary Examiner—Lawrence J. Staab
Assistant Examiner—Bruce F. Wojciechowski
Attorney, Agent, or Firm—Schwartz, Jeffery, Schwaab, Mack, Blumenthal & Koch

[57] ABSTRACT

A final gear train includes a differential case rotatably mounted within a bell shaped portion of a transmission case between it and a bearing retainer attached to the transmission case by means of two bearings, one bearing being disposed at the bottom of the bell shaped portion, the other bearing disposed around a portion of the bearing retainer to rotatably support a final gear attachment portion of the differential case. The final gear attachment portion is in the form of an axially extending annular portion axially extending from a main body portion of the differential case. This bearing arrangement provides a strong radial rigidity to the final gear attachment portion and prevents deformation of the final gear attachment portion during the transmission of torque.

5 Claims, 3 Drawing Figures

GEAR NOISE SUPPRESSING TYPE FINAL GEAR TRAIN OF TRANSAXLE

BACKGROUND OF THE INVENTION

1. Field of the Invention

The present invention relates to a gear noise suppressing type final gear train of a transaxle for an automobile.

2. Description of the Prior Art

Referring to a conventional final gear train of a transaxle for a front engine front driven automobile, often abbreviated as a "F-F vehicle", a differential case is rotatably mounted within a transmission case by two bearings, one being arranged near the bottom of a bell-shaped portion of the transmission case and the other bearing being arranged within a bearing retainer which is attached to the transmission case in a spaced relationship with the bottom of the bell shaped portion of the transmission case along the axis of rotation of a pair of side gears attached to front axle shafts, respectively. The differential case has a main body portion and a final gear attachment portion in the form of an axially extending generally annular portion extending axially from the main body portion that has mounted therein a pinion assembly and side gears. A final gear is attached to the final gear attachment portion.

According to this known final gear train, the axially extending generally annular final gear attachment portion deforms upon application of a large torque to the final gear, causing an incorrect contact between the teeth of the final gear and the mating teeth of the idler gear, causing a gear noise owing to the incorrect teeth contact.

SUMMARY OF THE INVENTION

According to the present invention one of the bearing used to rotatably support a differential case is disposed on the inner peripherial portion of a final gear attachment portion of the differential case. This bearing arrangement provides a strong radial rigidity to the final gear attachment portion, thus preventing deformation of the final gear attachment portion.

Accordingly, an object of the present invention is to provide a noise suppressing type final gear train which is free from a gear noise.

BRIEF DESCRIPTION OF THE DRAWINGS

The present invention will be hereinafter described in connection with the drawings, wherein.

DETAILED DESCRIPTION OF THE INVENTION

The before mentioned known final gear train is explained in connection with FIG. 1 before entering into the discussion of the invention.

Figure 1:
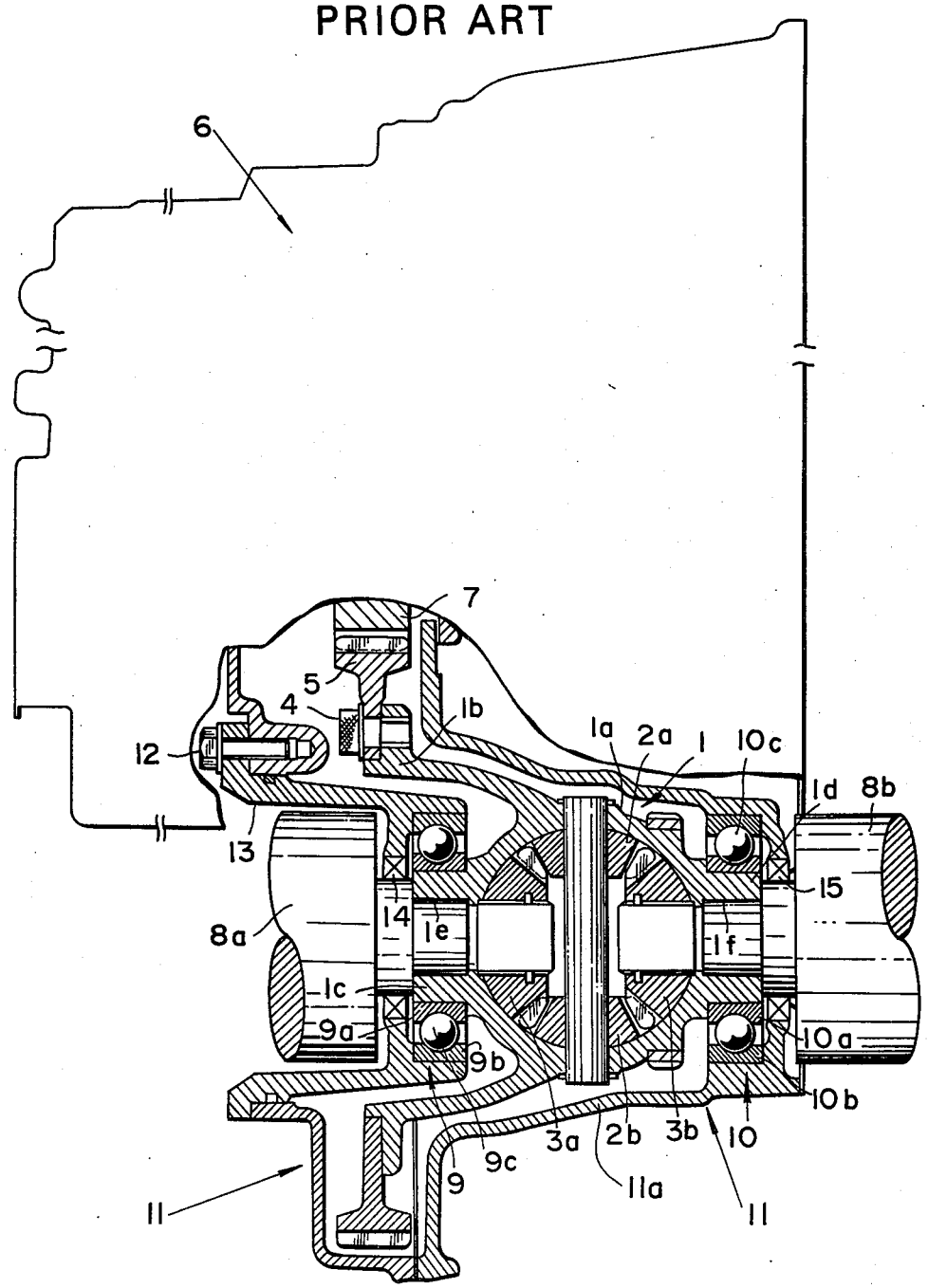
FIG. 1 is a side elevation of a transaxle for a F-F vehicle which is partly sectioned to illustrate the before mentioned known final gear train.

Referring to FIG. 1, a differential case 1 includes a main body portion 1a which has mounted therein a pinion assembly including a pair of pinions 2a, 2b and has also mounted theein a pair of side gears 3a, 3b meshing the pinions 2a, 2b, respectively. The differential case 1 includes a final gear attachment portion 1b in the form of an axially extending generally annular portion extending axially from the main body portion 1a. To the attachment portion 1b a final gear 5 is bolted by bolt means 4. The ring gear 5 meshes an idler gear 7 which meshes an output gear (not shown) of a transmission 6. The side gears 3a, 3b mounted within the main body portion 1a are attached to a pair of front axle shafts 8a, 8b, respectively, which shafts 8a, 8b extend, in the opposite directions, outwardly after passing through apertures 1e, 1f of cylindrical portions 1c, 1d formed at both axial end sides of the main body portion 1a. With two bearings 9, 10, the differential case 1 is rotatably mounted within a bell-shaped portion 11a of a transmission case 11 and between the bell-shaped portion 11a and a bearing retainer 13 attached to the transmission case 11 by bolt means 12. The bearing 10 is disposed at the bottom portion of the bell-shaped portion 11a to rotatably support the cylindrical portion 1f of the differential case 1, while, the other bearing 9 is disposed within the bearing retainer 13 to rotatably support the other cylindrical portion 1c. Explaining more in detail, inner races 9a, 10a of the bearings 9, 10 are fixedly attached to the cylinder portions 1c, 1d of the differential case main body portion 1a, whereas, outer races 9b, 10b of the bearings 9, 10 are fixedly attached to the bearing retainer 13 and the transmission case 11, respectively, with balls 9c between the inner race 9a and outer race 9b and balls 10c between the inner race 10a and outer race 10b. A space among the front axle shafts 8a, 8b, bearing retainer 13 and transmission case 11 is sealed by oil seals 14 and 15. Explaining a power path, the ring gear 5 is rotated by the idler gear 7 and rotates the differential case 1 and in turn the front axle shafts 8a, 8b via the pinions 2a, 2b and side gears 3a, 3b. The pinions 2a, 2b rotate relatively to the side gears 3a, 3b depending upon a difference in load on the front axle shafts 8a, 8b, thus serving as a differential mechanism.

This conventional final gear train has the previously mentioned problem of producing a gear noise.

Figure 2:
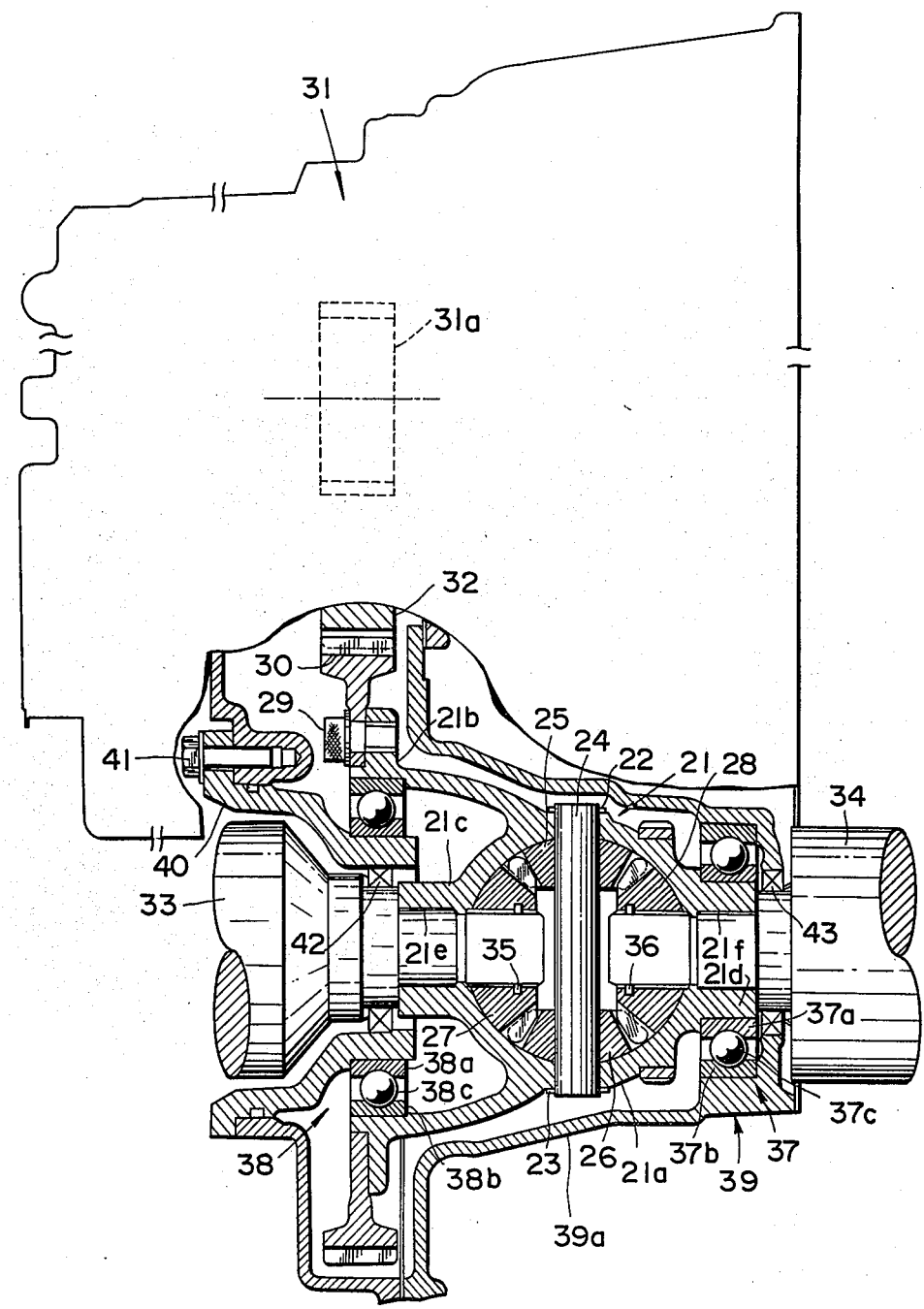
FIG. 2 is a similar view to FIG. 1 illustrating a final gear train according to the present invention.

Referring to FIG. 2, one of the preferred embodiments according to the present invention is explained.

A differential case 21 includes a main body portion 21a and a final gear attachment portion 21b in the form of an axially extending generally annular portion extending axially from the main body portion 21a. Mounted within the main body portion 21a are a pinion assembly including a pair of pinions 25, 26 rotatably carried by a pinion mate shaft 24 fixedly attached to the main body portion 21a via snap rings 22 and 23. A pair of side gears 27, 28 which mesh the pinions 25, 26, are arranged at right angles to the axis of rotation of the pinions 25, 26. A final gear 30 is attached to the final gear attachment portion 21b by bolt means 29, which gear 30 mesh an output gear 31a of a transmission 31 via an idler gear 32. The side gears 27, 28 are splined to end portions of the front axle shafts 33, 34 and axially fit in position relative thereto by rings 35, 36. The front axle shafts 33, 34 extend in the opposite directions and outwardly after passing through apertures 21e, 21f formed through cylindrical portions 21c, 21d of the main body portion 21a, respectively. The differential case 21 is rotatably supported by two bearings 37, 38, one disposed on the bottom portion of a bell-shaped portion 39a of the transmission case 39 and the other disposed on a bearing retainer 40 attached to the transmission case 39 by bolt means 41 in an axially spaced relationship with the bottom portion of the bell-shaped portion 39a. Therefore, the bearing retainer 40 is an integral part of the transmission case 39. One bearing 37 of them is disposed around and on the outer periphery of the cylindrical portion 21d. Explaining in more detail, an inner race 37a is fixedly attached to the cylindrical portion 21d, whereas, an outer race 37b is fixedly attached to the bottom portion of the bell-shaped portion 39a of the transmission case 39 with balls 37c disposed between the inner race 37a and outer race 37b. The other bearing 38 is arranged on the inner peripherial portion of the final gear attachment portion 21b substantially inwardly of the final gear 30 and around an outer peripherial portion of the bearing retainer 40. Explaining more in detail, an outer race 38b is fixedly attached to the inner peripherial portion of the final gear attachment portion 21b, whereas, an inner race 38a is attached to the outer peripherial portion of the bearing retainer 40 with balls 38c between the inner race 38a and the outer race 38b. A space between the output shaft 33 and the bearing retainer 40 is sealed by an oil seal 42, whereas, a space between the output shaft 34 and the transmission case 39 is sealed by an oil seal 43.

It will now be understood that the bearing 38 is disposed between the final gear attachment portion 21b and the bearing retainer 40 and is disposed inwardly of the final gear 30. This bearing arrangement provides a strong radial rigidity to the final gear attachment portion 21b in the form of the axially extending generally annular portion of the differential case 21.

In this final gear train, a torque applied to the final gear 30 from the output gear 31a via the idler gear 32 is transmitted to the differential case 21 and further to the front axle shafts 33, 34 via the pinions 25, 26 and side gears 27, 28, and the pinions 25, 26 rotate relatively to the side gears 27, 28 depending upon a difference in load on the output shafts 33, 34 so as to serve as a differential mechanism. During the transmission of the torque, even if a large load is applied to the final gear 30 as a result of the application of a large torque to the final gear 30, this load is directly carried by the bearing 38 without creating a force which may cause deformation of the axially extending generally annular portion. Therefore, a correct tooth contact relationship between the ring gear 30 and idler gear 32 is maintained even in the event a large load is applied to the final gear 30, thus preventing an increase in gear noise during operation with a large load.

Figure 3:
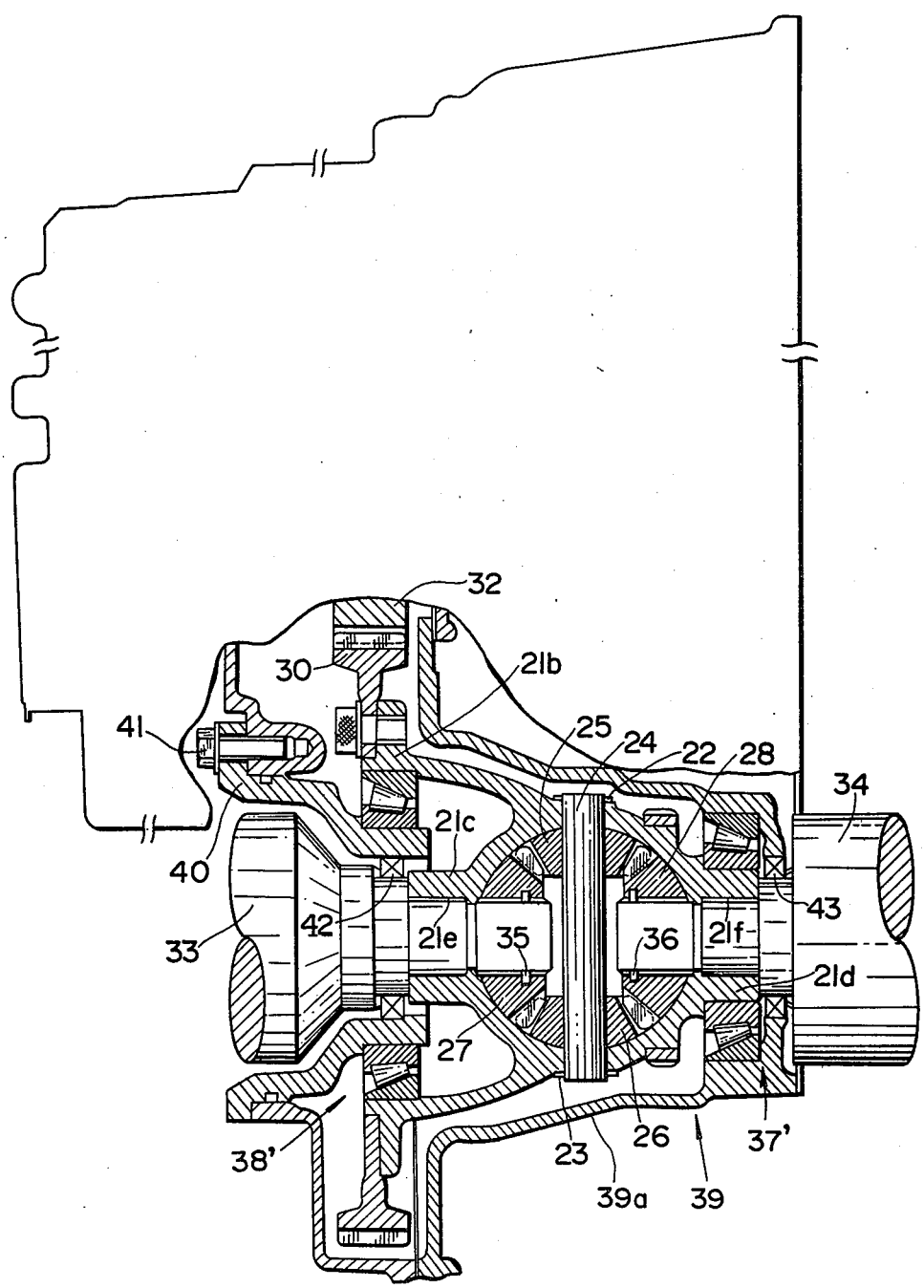
FIG. 3 is a similar view to FIG. 2 illustrating another embodiment wherein tapered roller bearings are used instead of the ball bearings used in FIG. 2 for supporting a differential case.

In the preceding embodiment, ball bearings are used as the bearings 37, 38, the present invention may be applied to the structure as shown in FIG. 3 where taper roller bearings 37', 38' are used with substantially the same function and effect.

Since the bearing retainer 40 is reduced in diameter at a portion inwardly of the final gear attachment portion 21b of the differential case 21 to provide a space for the bearing 38, an additional space which may cause an increase in a longitudinal direction of the transaxle is not required.

What is claimed is:

1. A final gear train of a transaxle having a transmission, the transmission having a transmission case including a bell-shaped portion with a bottom portion and a bearing retainer attached to the transmission case in a spaced relationship with the bottom portion of the bell-shaped portion to form an integral part of the transmission case, the transmission also including an output gear, the final gear train comprising:
a final gear drivingly connected with the output gear;
a first bearing and a second bearing;
a differential case rotatably mounted to the transmission case within the bell-shaped portion via said first and second bearings, said differential case including a main body portion and a final gear attachment portion in the form of an axially extending generally annular portion extending axially from said main body portion, said final gear attachment portion having said final gear;
said main body portion of said differential case having mounted therein a pinion assembly including pinions rotatably carried by a pinion mate shaft fixed to said main body portion and side gears meshing said pinions and attached to a pair of axle shafts, respectively;
said first bearing being disposed between the final gear attachment portion and the bearing retainer of the transmission case, said first bearing being disposed inwardly of said final gear and in the same plane as that in which said final gear lies.

2. A final gear train as claimed in claim 1, wherein said second bearing has an outer race attached to said final gear attachment portion, a mating inner race attached to said outer peripherial portion of said bearing retainer, and rotatable means disposed between said inner and outer races.

3. A final gear train as claimed in claim 2, wherein said first and second bearings are in the form of a ball bearing.

4. A final gear train as claimed in claim 2, wherein said first and second bearings are a taper roller bearing.

5. In a final gear train of a transaxle having a transmission including an output gear,
a transmission case having a bell-shaped portion formed with an opening at the bottom thereof and a bearing retainer securely attached to said transmission case to become an integral part thereof;
a first bearing;
a second bearing;
a differential gearing including a differential case rotatably mounted within said bell-shaped portion of said transmission case via said first and second bearing, a first axle shaft and a second axle shaft extending outwardly through said differential case, said differential case including a main body portion, a first cylindrical portion and a second cylindrical portion through which said first and second axle shafts extend, respectively, a generally annular final gear attachment portion extending axially outwardly from said main body portion and surrounding said first cylindrical portion, said generally annular final gear attachment portion having one end connected to said main body portion and an opposite end;
a final gear drivingly connected with the output gear and securely mounted to said opposite end of said generally annular final gear attachment portion;
said first bearing being mounted between said opposite end of said generally annular final gear attachment portion and said bearing retainer of said transmission case, said first bearing being disposed inwardly of said final gear and outwardly of said first cylindrical portion, said final gear and said first bearing lying in substantially the same plane.

* * * * *